United States Patent Office 2,949,477
Patented Aug. 16, 1960

2,949,477

1,3,17-TRIACETOXYESTRA-1,3,5(10),16-TETRAENE AND CONGENERS

James Jiu, Morton Grove, Ill., assignor to G. D. Searle & Co., Chicago, Ill., a corporation of Delaware No Drawing. Filed Mar. 4, 1959, Ser. No. 797,013

8 Claims. (Cl. 260—397.5)

This invention relates to 1,3,17-triacetoxyestra-1,3,5-(10),16-tetraene and the 17-thio analog thereof, as also to alcohols, ethers, and other esters corresponding thereto. More particularly, this invention relates to products of the formula

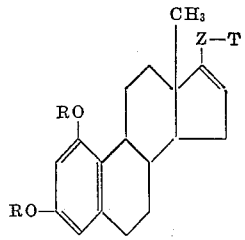

wherein R represents hydrogen or an alkyl, alkanoyl, or aroyl radical; Z represents oxygen or sulfur; and T represents an alkyl, alkanoyl, or aroyl radical.

Among the alkyl radicals represented by R and T in the foregoing formula, especially lower alkyl radicals are preferred, for example, methyl, ethyl, propyl, isopropyl, butyl, isobutyl, sec-butyl, tert-butyl, pentyl, isopentyl, tert-pentyl, neopentyl, hexyl, isohexyl, heptyl, octyl, and like $C_nH_{2n+1}$ groupings wherein $n$ is a positive integer amounting to less than 9. As to the alkanoyl radicals represented by R and T above, these likewise are preferably of lower order and, accordingly, are most desirably groupings of the formula —CO-lower alkyl The preferred aroyl radical represented by R and T is the benzoyl grouping.

The subject products are useful because of their valuable pharmacological properties. They have, for example, the capacity to decrease the serum concentration of cholesterol and the corresponding cholesterol/phospholipid ratio without at the same time producing the potent estrogenic side-effects characteristic of prior art compositions adapted to regulation of cholesterol metabolism. It follows that the intermediates from which these valuable products can be manufactured are also useful.

The 1,3,17-tri(alkanoyl and benzoyl)oxy esters hereof are prepared by heating 1,3-dihydroxyestra-1,3,5(10)-trien-17-one with an appropriate acid chloride or anhydride in the present of p-toluenesulfonic acid. As an exception to this procedure, isopropenyl acetate is substituted for the acid chloride or anhydride where manufacture is directed specifically to 1,3,17-triacetoxyestra-1,3,5-(10),16-tetraene. The 17-thio esters hereof are prepared by contacting 1,3-dihydroxyestra-1,3,5(10)-triene-17-thione with an appropriate acid chloride or an anhydride in the presence of pyridine. Finally, the 17-thio ethers of this invention are prepared by contacting 1,3-dihydroxyestra-1,3,5(10)-triene-17-thione with an appropriate alkyl halide in the presence of alkali alkoxides.

The following examples describe in detail certain of the products illustrative of the present invention and methods which have been devised for their manufacture. However, the invention is not to be construed as limited thereby, either in spirit or in scope, since it will be apparent to those skilled in the art of organic synthesis that many modifications, both of materials and of methods, may be practiced without departing from the purpose and intent of this disclosure. In the examples hereinafter detailed, temperatures are given in degrees centigrade and relative amounts of materials in parts by weight, except as otherwise noted.

Example 1

*1,3,17 - triacetoxyestra-1,3,5(10),16-tetraene.*—A solution of 9 parts of 1,3-diacetoxyestra-1,3,5(10)-trien-17-one (preparable by the procedure of Example 1B in U.S. 2,861,086) and 2 parts of p-toluenesulfonic acid in 305 parts of isopropenyl acetate is slowly distilled until effectivley no more acetone comes over (representatively, after about 8 hours), whereupon the mixture is cooled, diluted with ethyl acetate, and finally consecutively washed with aqueous dilute potassium bicarbonate and water. The resultant mixture is dried over anhydrous sodium sulfate and stripped of solvent by vacuum distillation. The residue is chromatographed on Fuller's earth using hexane and benzene as developing solvents. The purified product obtained by this means is 1,3,17-triacetoxyestra-1,3,5(10),16-tetraene which, recrystallized from methanol, melts at approximately 177–178°. The product has the formula

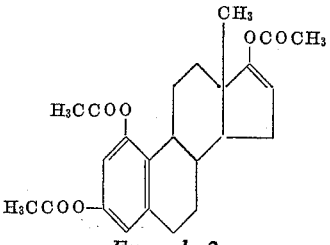

Example 2

*1,3,17 - tribenzoyloxyestra-1,3,5(10),16-tetraene.*—An anhydrous mixture of 2 parts of 1,3-dihydroxyestra-1,3,5-(10)-trien-17-one (preparable by the procedure of Example 2 in U.S. 2,861,086), 12 parts of benzoyl chloride, 1 part of p-toluenesulfonic acid, 160 parts of tetrachloroethane, and 140 parts of 2,2,4-trimethylpentane is heated at the boiling point under reflux for a total of 40 hours. After the first 24 hours of the heating period, a second 12-part quantity of benzoyl chloride is introduced. At the close of the heating period, the reaction mixture is concentrated by distillation in vacuo to a relatively small volume, then diluted with water, and finally extracted with chloroform. The chloroform extract is washed with water, dried over anhydrous sodium sulfate, and stripped of solvent by vacuum distillation. The residue, chromatographed on Fuller's earth, using hexane and benzene as developing solvents, affords the desired 1,3,17-tribenzoyloxyestra-1,3,5(10),16 - tetraene, of the formula

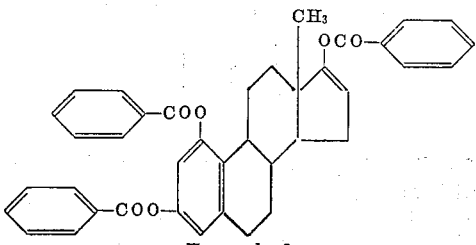

Example 3

A. *1,3 - diacetoxy - 17α,17β - bis(benzylthio)estra-1,3,-*

5(10)-triene.—A mixture of 23 parts of 1,3-diacetoxy-estra-1,3,5(10)-trien-17-one, 17 parts of benzyl mercaptan, 74 parts of acetic acid, and 2 parts of p-toluenesulfonic acid is maintained at room temperatures for 20 hours. Approximately 6 parts of sodium acetate and 200 parts of ice are then mixed in, whereupon the resultant mixture is made slightly basic with sodium carbonate and then extracted with ether. The ether extract is washed with water, dried over anhydrous sodium sulfate, and stripped of solvent by distillation. The residue is taken up in benzene and chromatographed on silica gel, using benzene and ethyl acetate as developing solvents. The desired 1,3 - diacetoxy - 17α,17β - bis(benzylthio)estra-1,3,5(10)-triene thus isolated can be represented by the formula

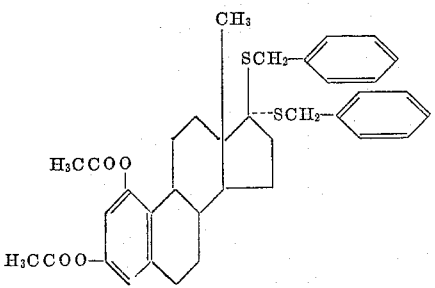

B. *1,3 - dihydroxyestra-1,3,5(10) - triene-17-thione.*—To a solution of 40 parts of sodium in 660 parts of liquid ammonia is added 25 parts of 1,3-diacetoxy-17α,17β-bis-(benzylthio)estra-1,3,5(10)-triene in 70 parts of ether. The reaction mixture is maintained with agitation for 2 hours, at which point an additional 560 parts of ether is introduced, followed consecutively and cautiously by 240 parts of ethanol and 600 parts of water. The resultant mixture is washed with ether and then acidified with ammonium chloride. The mixture thus obtained is extracted with ether. Evaporation of solvent from the ether extract affords as the residue, 1,3-dihydroxyestra-1,3,5(10)-triene-17-thione. The product has the formula

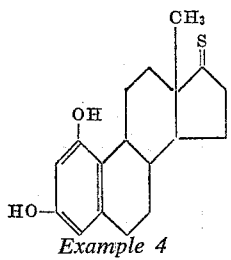

*Example 4*

C. *1,3 - diacetoxy - 17 - acetylthioestra - 1,3,5(10),16-tetraene.*—A mixture of 17 parts of 1,3-dihydroxyestra-1,3,5(10)-triene-17-thione, 250 parts of pyridine, and 250 parts of acetic anhydride is maintained with agitation at room temperatures for 20 hours. The mixture is then poured into several times its volume of water, and the insoluble solid product thrown down is collected on a filter. The material thus isolated is 1,3-diacetoxy-17-acetylthioestra-1,3,5(10),16-tetraene, of the formula

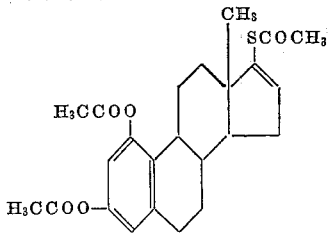

*Example 4*

*1,3 - dipropionyloxy - 17 - propionylthioestra - 1,3,5-(10),16 - tetraene.*—A mixture of 1 part of 1,3-dihydroxyestra-1,3,5(10)-triene-17-thione, 10 parts of pyridine, and 5 parts of propionic anhydride is maintained with agitation at room temperatures for 25 hours. The mixture is then diluted with several times its volume of ice water, and the insoluble product thrown down is collected on a filter and washed thereon with water. The material thus obtained is the tripropionyl derivative, 1,3-dipropionyloxy-17-propionylthioestra-1,3,5(10),16-tetraene. The product has the formula

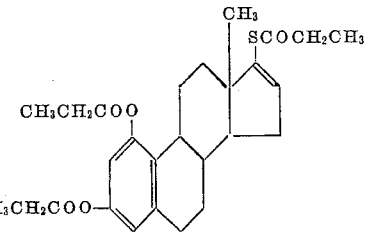

*Example 5*

*17 - methylthioestra - 1,3,5(10),16 - tetraene - 1,3-diol.*—To a solution of 11 parts of sodium methoxide in 800 parts of methanol is added, with agitation, 12 parts of 1,3-dihydroxyestra-1,3,5(10)-triene-17-thione, followed by 29 parts of methyl iodide. Approximately 10 minutes later, the mixture is diluted with 2000 parts of water. Introduction of 100 parts of acetic acid at this point causes heavy precipitation. The insoluble product is collected on a filter. The material thus isolated is 17-methylthioestra-1,3,5(10),16-tetraene-1,3-diol. The product has the formula

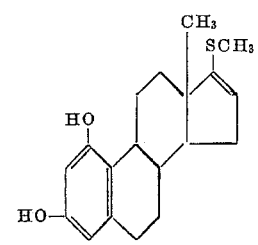

*Example 6*

*17 - propylthioestra - 1,3,5(10),16 - tetraene - 1,3-diol.*—To a solution of 16 parts of sodium methoxide and 62 parts of 1-iodopropane in 800 parts of methanol is added, with agitation, 90 parts of 1,3-dihydroxyestra-1,3,5-(10)-triene-17-thione. An insoluble product soon appears; and when precipitation is complete, it is collected on a filter and washed. This product is the desired 17-propylthioestra-1,3,5(10),16-tetraene-1,3-diol. The product has the formula

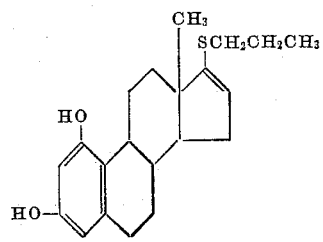

*Example 7*

*1,3-dihydroxyestra-1,3,5(10)-triene-17-thione.*—A mixture of 15 parts of 1,3-dihydroxyestra-1,3,5(10)-trien-17-one, 830 parts of purified dioxane, and 320 parts of anhydrous ethanol is perfused with hydrogen sulfide and hydrogen chloride during agitation at 0–10° for approximately 2 hours. At the end of this time, introduction of the 2 gases is discontinued. Agitation at 0–10° is maintained for 4 hours longer, following which solvent is removed by distillation. The residue is 1,3-dihydroxyestra-1,3,5(10)-triene-17-thione, the same product obtained by the procedure of Example 3B.

What is claimed is:
1. A compound of the formula

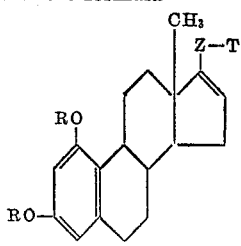

wherein R is selected from the group consisting of hydrogen and benzoyl and lower alkanoyl radicals; Z is selected from the group consisting of oxygen and sulfur; and T is selected from the group consisting of lower alkyl, benzoyl, and lower alkanoyl radicals.

2. 1,3,17-triacetoxyestra-1,3,5(10),16-tetraene.
3. 1,3,17-tribenzoyloxyestra-1,3,5(10),16-tetraene.
4. A product of the formula

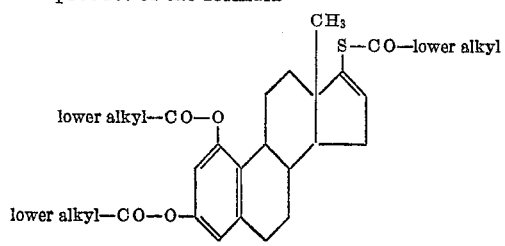

5. 1,3 - diacetoxy - 17 - acetylthioestra - 1,3,5(10), 16-tetraene.
6. A product of the formula

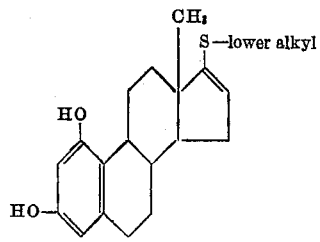

7. 17 - methylthioestra - 1,3,5(10),16 - tetraene - 1,3-diol.
8. 1,3-dihydroxyestra-1,3,5(10)-triene-17-thione.

References Cited in the file of this patent

UNITED STATES PATENTS

| | | |
|---|---|---|
| 2,840,577 | Dodson et al. | June 24, 1958 |
| 2,861,086 | Jiu | Nov. 18, 1958 |